United States Patent
Mani et al.

(10) Patent No.: US 12,164,670 B2
(45) Date of Patent: Dec. 10, 2024

(54) METHOD AND ELECTRONIC DEVICE FOR SECURELY SHARING OF DATA

(71) Applicant: Samsung Electronics Co., Ltd., Suwon-si (KR)

(72) Inventors: Sharmila Mani, Bengaluru (IN); Shubham Jain, Bengaluru (IN); Renju Chirakarotu Nair, Bengaluru (IN); Nikhil Sahni, Bengaluru (IN); Umesh Murlidhar Patil, Bengaluru (IN); Balwant Singh Shekhawat, Bengaluru (IN); Aditya Jhawar, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 17/859,661

(22) Filed: Jul. 7, 2022

(65) Prior Publication Data
US 2023/0012736 A1    Jan. 19, 2023

(30) Foreign Application Priority Data

Jul. 9, 2021   (IN) .............................. 202141030965
Jun. 6, 2022   (IN) .............................. 2021 41030965

(51) Int. Cl.
*G06F 21/00* (2013.01)
*G06F 21/62* (2013.01)

(52) U.S. Cl.
CPC ................................ *G06F 21/6254* (2013.01)

(58) Field of Classification Search
CPC .......................... G06F 21/6254; G06F 21/1085
See application file for complete search history.

(56) References Cited

U.S. PATENT DOCUMENTS

| | | | |
|---|---|---|---|
| 8,316,237 | B1 | 11/2012 | Felsher et al. |
| 10,671,745 | B2 | 6/2020 | Lee et al. |
| 11,423,168 | B2 | 8/2022 | Lee et al. |
| 11,438,356 | B2* | 9/2022 | Sern ............... G06F 21/552 |
| 2015/0007249 | A1* | 1/2015 | Bezzi .............. G06F 21/6227 726/1 |
| 2017/0053128 | A1 | 2/2017 | Lee et al. |

(Continued)

FOREIGN PATENT DOCUMENTS

CN    107924432 A    4/2018

OTHER PUBLICATIONS

Mohassel et al., SecureML: A System for Scalable Privacy-Preserving Machine Learning, May 22, 2017.

(Continued)

*Primary Examiner* — Ka Shan Choy
(74) *Attorney, Agent, or Firm* — Jefferson IP Law, LLP

(57) ABSTRACT

A method for securely sharing of data by an electronic device is provided. The method includes receiving, by the electronic device, data associated with the at least one application available at the electronic device and obtaining, by the electronic device, secured data by transforming the data associated with at least one application into an unrecognizable format using at least one conceal factor and at least one noise input. Further, the method includes extracting, by the electronic device, a plurality of features from the secured data, and sharing, by the electronic device, the plurality of features extracted from the secured data to a plurality of servers.

12 Claims, 20 Drawing Sheets

(56) References Cited

U.S. PATENT DOCUMENTS

| | | | |
|---|---|---|---|
| 2019/0303610 A1* | 10/2019 | Bodegas Martinez | G06F 16/152 |
| 2020/0082120 A1* | 3/2020 | Richardson | G06F 21/604 |
| 2020/0241991 A1* | 7/2020 | Patton | G06F 21/6254 |
| 2020/0257819 A1 | 8/2020 | Lee et al. | |
| 2021/0056405 A1* | 2/2021 | Bradshaw | G06N 3/08 |
| 2022/0067203 A1* | 3/2022 | Pottier | G06N 20/00 |
| 2022/0358245 A1* | 11/2022 | Weerasinghe | G06F 21/6254 |

OTHER PUBLICATIONS

Ran et al., CryptoNets: Applying Neural Networks to Encrypted Data with High Throughput and Accuracy, 2016.

Zheng et al., Helen: Maliciously Secure Coopetitive Learning for Linear Models, Sep. 4, 2019.

Chen et al., Secure Computation for Machine Learning With SPDZ, Jan. 2, 2019.

Indian Examination Report dated Feb. 16, 2023, issued in Indian Patent Application No. 202141030965.

\* cited by examiner

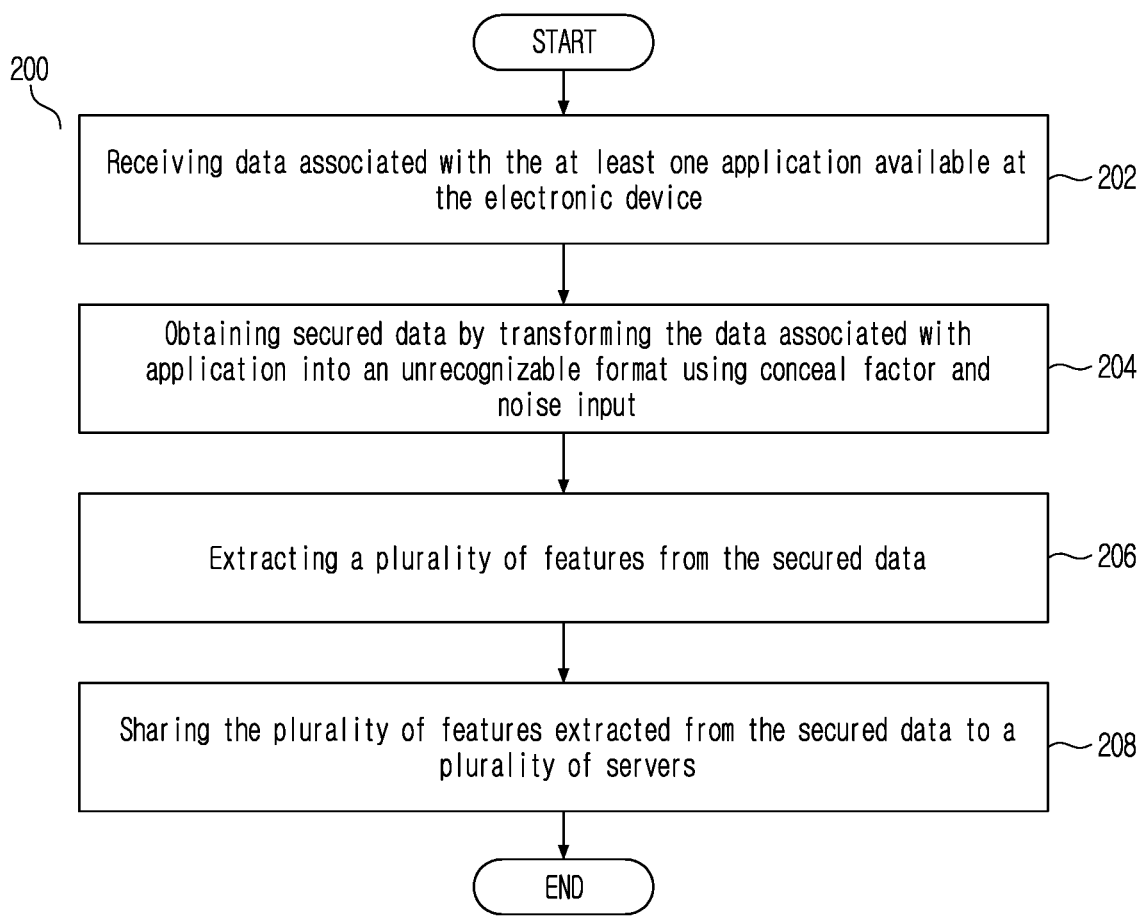

METHOD AND ELECTRONIC DEVICE FOR SECURELY SHARING OF DATA

CROSS-REFERENCE TO RELATED APPLICATION(S)

The application is based on and claims priority under 35 U.S.C. § 119(a) of an Indian Provisional patent application number 202141030965, filed on Jul. 9, 2021, in the Indian Patent Office, and of an Indian Complete patent application number 202141030965, filed on Jun. 6, 2022, in the Indian Patent Office, the disclosure of each of which is incorporated by reference herein its entirety.

BACKGROUND

1. Field

The disclosure relates to data security. More particularly, the disclosure relates to a method and electronic device for securely sharing of data to multiple servers.

2. Description of Related Art

In general, data is a driver for training and inferencing for all forms of machine learning (ML). ML models require data which may be at times sensitive, such as health-related data, financial data, search histories of users, and conversations between the users for the training and the inferencing. However, the sensitive data may pose privacy risks to the users as private user data is uploaded for the training and the inferencing of the ML models.

Conventionally, the sensitive data is encrypted to allow a ML model owning organization to use the sensitive data to compute respective ML model. Several encryption schemes exist that allow computation over encrypted data, which includes but are not limited to Secure Multi-Party Computation (SMPC), Homomorphic Encryption (FHE/SHE) and Functional Encryption (FE).

Secure Multi-Party Computation (SMPC) is a cryptographic method that allows distributed parties to mutually compute an arbitrary function without having to disclose their own private inputs to the rest of the parties. The SMPC implementations use different encryption schemes to protect private data yield accuracy which is not at par with accuracy results obtained from training the ML models over original data as some important data patterns crucial for function learning are lost during encryption phase. Further, applying strong encryption schemes can be expensive and a time consuming process. Further, real-world implementations of the SMPC using Smart Pastro Damgard Zakarias (SPDZ) protocol focuses on training simple linear models using high dimensional raw data over multiple servers. Such implementations are pre-dominantly slow because of large inter-server communication, costs arising because of computations over large dimensional inputs and subsequently yield low accuracy because of using the simple linear models for learning complex classification and regression tasks.

Currently, a large number of mobile applications are limited due to lack of access to real world data. For example consider an application using ML for detection of skin cancer where a user can click a photo of a skin lesion using the application and get the photo analyzed to detect the possibility of the skin cancer. Such application requires access to large set of clinical photos to train the corresponding ML model. However, the clinical photos could be considered sensitive and hence may not be used for training the ML model. Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device for securely sharing of data to multiple servers where sensitive user data is transformed into an unrecognizable format using noise input and only extracted features from the secured data are shared to the multiple servers for training ML models. Therefore, the proposed method ensures data privacy of sensitive data of users at the same time enabling learning of ML models with large amount of data providing higher accuracy and efficiency.

Additional aspects will be set forth in part in the description which follows and, in part, will be apparent from the description, or may be learned by practice of the presented embodiments.

In accordance with an aspect of the disclosure, a method for securely sharing of data by an electronic device ids provided. The method includes receiving, by the electronic device, data associated with the at least one application available at the electronic device and obtaining, by the electronic device, secured data by transforming the data associated with at least one application into an unrecognizable format using at least one conceal factor and at least one noise input. Further, the method includes extracting, by the electronic device, a plurality of features from the secured data, and sharing, by the electronic device, the plurality of features extracted from the secured data to a plurality of servers.

In an embodiment, obtaining, by the electronic device, the secured data by transforming the data associated with the at least one application into the unrecognizable format using the at least one conceal factor and the at least one noise input includes determining, by the electronic device, the at least one conceal factor based on the plurality of features of the data associated with the at least one application and obtaining, by the electronic device, concealed data by multiplying the data with the at least one conceal factor data to hide a plurality of details associated with the data. Further, the method includes determining, by the electronic device, the at least one noise input to be added to the concealed data to transform the concealed data into unrecognizable format, and obtaining, by the electronic device, the secured data by transforming the concealed data into the unrecognizable format by adding the at least one noise input to the concealed data.

In an embodiment, the plurality of features extracted from the secured data are used to perform at least one of train at least one model at least one server and perform an inference using the at least one model at the at least one server.

In an embodiment, the at least one noise input comprises at least one of a Gaussian noise comprising Gaussian Distributed values of the at least one noise input, a salt-and-pepper comprising sparse distribution of noise values of the at least one noise input, and a Speckle noise comprising granular interference of the at least one noise input.

In an embodiment, extracting, by the electronic device, the plurality of features from the secured data includes reducing, by the electronic device, a dimension of the secured data by performing a compressing on the secured data, recreating, by the electronic device, the concealed data comprising the plurality of features of the data associated with the at least one application using the compressed secured data, and extracting, by the electronic device, the plurality of features from the recreated concealed data.

In an embodiment, the plurality of features from the data is extracted by an auto-encoder of the electronic device, wherein the auto-encoder is trained with the plurality of parameters associated with the at least one model.

In an embodiment, sharing, by the electronic device, the plurality of features extracted from the secured data to the plurality of servers includes splitting, by the electronic device, the extracted plurality of features into a plurality of groups, and sharing, by the electronic device, at least one group of the plurality of groups comprising the plurality of extracted features to at least one server of the plurality of servers.

In accordance with another aspect of the disclosure, an electronic device for securely sharing of data is provided. The electronic device includes a memory, a processor, a communicator and a security management controller. The security management controller is configured to receive data associated with the application available at the electronic device and obtain secured data by transforming the data associated with application into an unrecognizable format using conceal factor and a noise input. Further, the security management controller is configured to extract a plurality of features from the secured data, and share the plurality of features extracted from the secured data to a plurality of servers.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a flow diagram for securely sharing data by an electronic device, according to an embodiment of the disclosure;

The same reference numerals are used to represent the same elements throughout the drawings.

DETAILED DESCRIPTION

Figure 1:
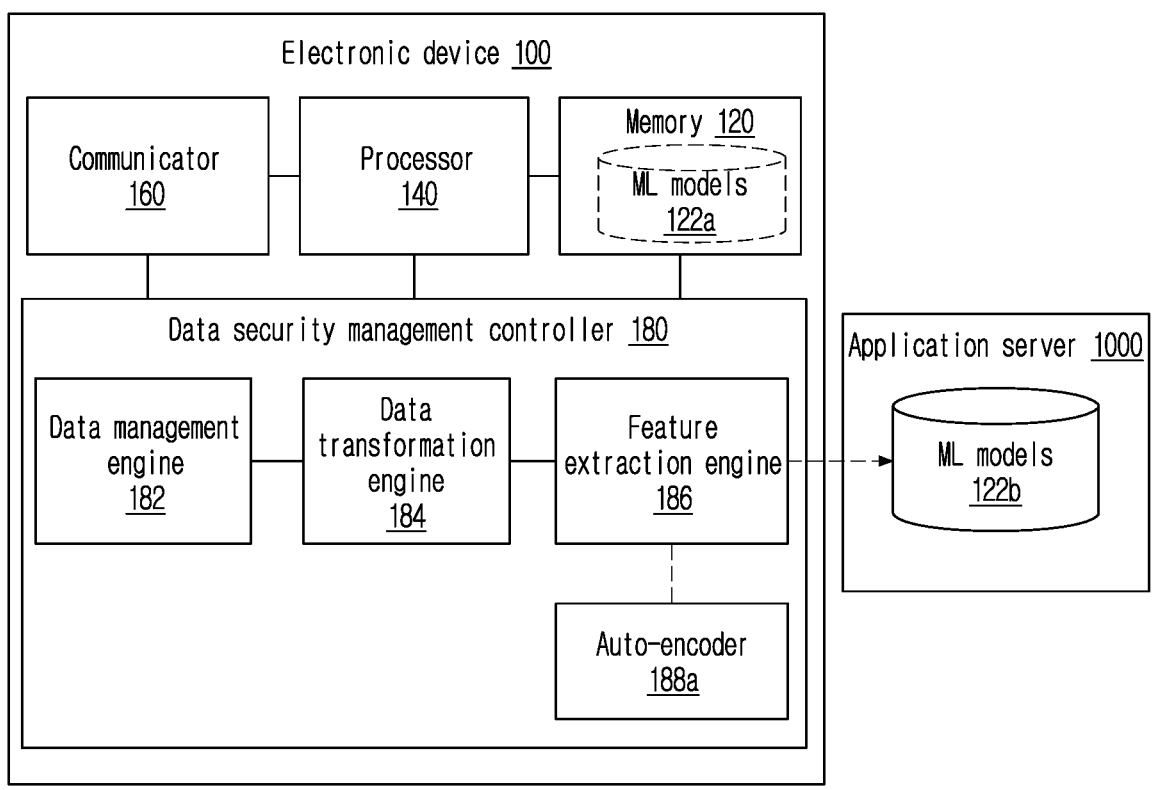
FIG. 1 is a block diagram of an electronic device for securely sharing data, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known and functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, controllers, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for securely sharing of data by an electronic device. The method includes receiving, by the electronic device, data associated with the at least one application available at the electronic device and obtaining, by the electronic device, secured data by transforming the data associated with at least one application into an unrecognizable format using at least one conceal factor and at least one noise input. Further, the method includes extracting, by the electronic device, a plurality of features from the secured data; and sharing, by the electronic device, the plurality of features extracted from the secured data to a plurality of servers.

Accordingly, the embodiments herein disclose an electronic device for securely sharing of data. The electronic device includes a memory, a processor, a communicator and a security management controller. The security management controller is configured to receive data associated with the application available at the electronic device and obtain secured data by transforming the data associated with application into an unrecognizable format using conceal factor and a noise input. Further, the security management controller is configured to extract a plurality of features from the secured data; and share the plurality of features extracted from the secured data to a plurality of servers.

In conventional methods and systems, user data needs to be directly shared with application servers which use the user data to train their ML models. However, the user data can be private data leading security concerns as the same will be used for training the ML models.

Unlike to the conventional methods and systems, the proposed SMPC method includes transforming the user data using noise input or extracting features from the user data followed by encryption of the extracted features. The transformed data is then used for training the ML models. Therefore, the proposed method provides potentially lower risk of exposure of private user data and hence increases incentive to participate in data collection. Further, with protecting the training data the proposed method also prevents anyone from inferring the learned model parameters as well.

Therefore, the proposed SMPC techniques encourages anyone with the electronic device to volunteer for contributing to the training set which would concretely help in the improvement of the model. The proposed SMPC techniques can be adopted for any data such as audio (1D), image (2D) and video (3D) and so on as the SMPC techniques are based on tensor and not on raw input.

Referring now to the drawings and more particularly to FIGS. 1, 2, 3A to 3D, 4A to 4E, 5A, 5B, and 6 to 11 where similar reference characters denote corresponding features consistently throughout the figures, there are shown preferred embodiments.

FIG. 1 is a block diagram of an electronic device for securely sharing data, according to an embodiment of the disclosure.

Referring to the FIG. 1, an electronic device 100 includes a memory 120, a processor 140, a communicator 160 and a data security management controller 180. The electronic device 100 may be for example but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device and an immersive system.

The memory 120 includes a plurality of ML models 122a which needs data to be trained. The memory 120 also stores instructions to be executed by the processor 140 for training the model by the SMPC. The memory 120 storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory. In certain examples, a non-transitory storage medium may store data that can, over time, change (e.g., in Random Access Memory (RAM) or cache). The memory 120 can be an internal storage or it can be an external storage unit of the electronic device 100, cloud storage, or any other type of external storage.

In an embodiment, the processor 140 communicates with, the memory 120, the communicator 160 and the data security management controller 180. The processor 140 is configured to execute instructions stored in the memory 120 for enabling multi-connectivity to avoid the jitters/RLFs/. The processor 140 may include one or a plurality of processors, may be a general purpose processor, such as a central processing unit (CPU), an application processor (AP), and the like, a graphics-only processing unit such as a graphics processing unit (GPU), a visual processing unit (VPU), and/or an Artificial intelligence (AI) dedicated processor such as a neural processing unit (NPU).

In an embodiment, the communicator 160 is configured for communicating internally between internal hardware components and with external devices via one or more networks. The communicator 160 includes an electronic circuit specific to a standard that enables wired or wireless communication.

In an embodiment, the data security management controller 180 includes a data management engine 182, a data transformation engine 184, a feature extraction engine 186 and an auto-encoder 188. The data security management controller 180 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the data management engine 182 is configured to receive data associated with at least one application available at the electronic device 100. For example, the data can include but not limited to: a user entering text in a chat application, an image captured for an image application, audio filed, documents, etc.

In an embodiment, the data transformation engine 184 is configured to determine the conceal factor based on the plurality of features of the data associated with the application and obtain concealed data by multiplying the data with the conceal factor data to hide a plurality of details associated with the data. Further, the data transformation engine 184 is configured to determine the noise input to be added to the concealed data to transform the concealed data into unrecognizable format; and obtain the secured data by transforming the concealed data into the unrecognizable format by adding the noise input to the concealed data. The secured data itself is the transformed data The noise input includes at least one of a Gaussian noise comprising Gaussian Distributed values of the at least one noise input, a salt-and-pepper comprising a sparse distribution of noise values of the at least one noise input, and a Speckle noise comprising granular interference of the at least one noise input.

In an embodiment, the feature extraction engine 186 is configured to reduce a dimension of the secured data by performing a compressing on the secured data, recreate the concealed data comprising the plurality of features of the data associated with the at least one application using the compressed secured data, and extract the plurality of features from the recreated concealed data.

Further, the feature extraction engine 186 is also configured to split the extracted plurality of features into a plurality of groups; and share at least one group of the plurality of groups comprising the plurality of extracted features to at least one server of the plurality of servers. The plurality of features extracted from the secured data are used to perform at least one of: train at least one model at least one server and perform an inference using the at least one model at the at least one server.

In another embodiment, the auto-encoder 188 is configured to receive plurality of parameters associated with models available at an application server 1000 and extract the plurality of features from the data based on the plurality of parameters associated with the model. The plurality of parameters can include but is not limited to concealed features extracted from the data with the at least one noise input. The plurality of parameters are determined by the application server 1000 using data associated with the application and at least one model to be trained from a plurality of electronic devices 100a-N using a Smart Pastro Damgard Zakarias (SPDZ) protocol. The final transformed and secure data is then used to train the ML models 122a which are located in the electronic device 100 or to train the ML models 122b which may be located in the application server 1000.

Although the FIG. 1 shows various hardware components of the electronic device 100, it is to be understood that other embodiments are not limited thereon. In other embodiments, the electronic device 100, the may include less or more number of components. Further, the labels or names of the components are used only for illustrative purpose and does not limit the scope of the disclosure. One or more components can be combined together to perform same or substantially similar function for training the model by the SMPC.

FIG. 2 is a flow diagram for securely sharing data by an electronic device, according to an embodiment of the disclosure.

Referring to the FIG. 2, at operation 202, the method includes the electronic device 100 receiving the data associated with the at least one application available at the electronic device 100. For example, in the electronic device 100 as illustrated in the FIG. 1, the data security management controller 180 is configured to receive the data associated with the at least one application available at the electronic device 100.

At operation 204, the method includes the electronic device 100 obtaining the secured data by transforming the data associated with the application into the unrecognizable format using the conceal factor and the noise input. For example, in the electronic device 100 as illustrated in the FIG. 1, the data security management controller 180 is configured to determine whether the amount of the data received from the at least one application meets the data quantity threshold.

At operation 206, the method includes the electronic device 100 extracting the plurality of features from the secured data. For example, in the electronic device 100 as illustrated in the FIG. 1, the data security management controller 180 is configured to extract the plurality of features from the secured data.

At operation 208, the method includes the electronic device 100 sharing the plurality of features extracted from the secured data to the plurality of servers. For example, in the electronic device 100 as illustrated in the FIG. 1, the data security management controller 180 is configured to share the plurality of features extracted from the secured data to the plurality of servers.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 3A:
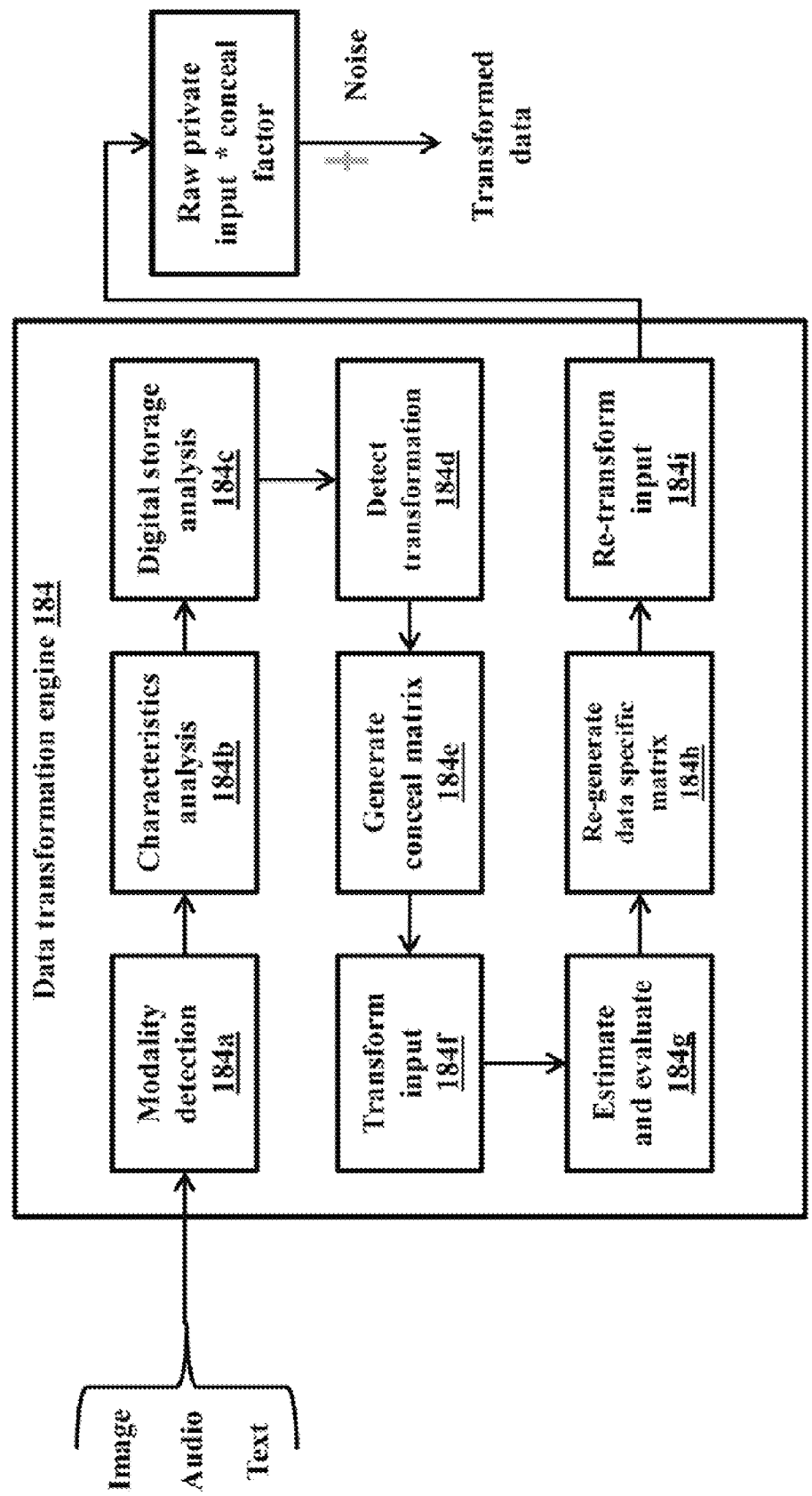
FIG. 3A is a block diagram of a data transformation engine, according to an embodiment of the disclosure.

FIG. 3A is a block diagram of an data transformation engine, according to an embodiment of the disclosure.

Referring to the FIG. 3A, consider that the data transformation engine 184 receives any of the inputs such as the image, the audio file, the video file, the text, etc. At step 184a, the data transformation engine 184 determines the modalities associated with the inputs such as the colour, texture, shape etc. in case the input is the image. At step 184b, the data transformation engine 184 performs the characteristics analysis of the determined modalities of the input and at step 184c, a digital storage analysis. Further, the data transformation engine 184 at step, 184d detects the transformation to be performed on the input and accordingly generates a conceal matrix at step 184e. Further, at step 184f, the data transformation engine 184 transforms the input using the conceal matrix/conceal factor. At step 184g, the data transformation engine 184 estimates and evaluates the transformed data as to whether the input is completely concealed, if the original characteristics of the input are still retained, etc. If the accuracy of the step 184g is not above a certain threshold, then the data transformation engine 184 re-generates the data specific matrix at step 184h and re-transforms the input using the re-generated data specific matrix at step 184i. The raw private input transformed by multiplying the conceal factor is obtained. Further, the final transformed data is obtained by adding the appropriate noise to the data which is concealed using the concealed factor.

Figure 3B:
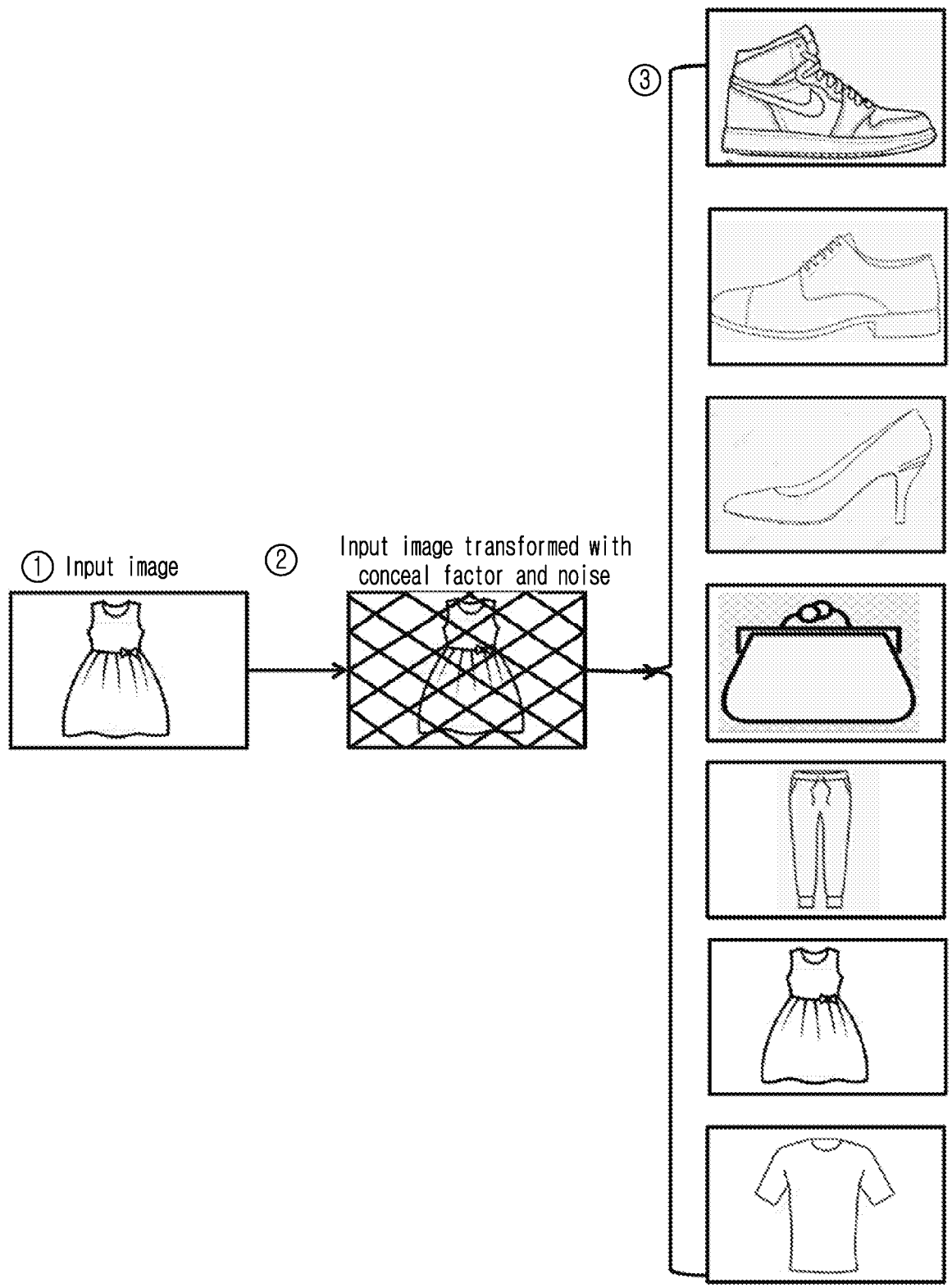
FIG. 3B is an example illustrating working of a data transformation engine, according to an embodiment of the disclosure.

FIG. 3B is an example illustrating working of a data transformation engine, according to an embodiment of the disclosure.

Referring to the FIG. 3B, at step 1, consider that the user provides an input image to the electronic device 100. The transformation method is used across different multimedia inputs like the text, the audio, the video and the images contributed by multiple data sources. The transformed data is then used to train a single ML model without revealing the original raw data.

At step 2, the electronic device 100 transforms the data by multiplying the data with a random fraction, small enough to weaken the data signal. This is followed by adding the noise signal to the weakened signal in order to perturb it. As a result, the input image becomes unrecognizable among the multiple images available at the electronic device 100 (multiple images shown in step 3). The fraction and noise used are decided by each contributor independently. The reverse transformation function hence could not be learnt by the adversary (ML model owner in this case) as the transformational function used is random in nature and is contributor specific. Therefore, the images in the unrecognizable format are used to train the ML models 122a or 122b which not only ensures user data privacy but also enhances overall security of the electronic device 100.

The degradation in accuracy because of training with the noisy inputs can be compensated by asking the contributor to submit more instances of the same data point (using different fraction and noise each time). Therefore, Transformed Data=Data*Conceal factor+Noise The transformation of the data methodology is inspired and backed by Data Augmentation technique which is widely used for the purpose of model generalization. Therefore, the proposed method utilizes data augmentation to perform the task of model training using encrypted/transformed data.

Figure 3C:
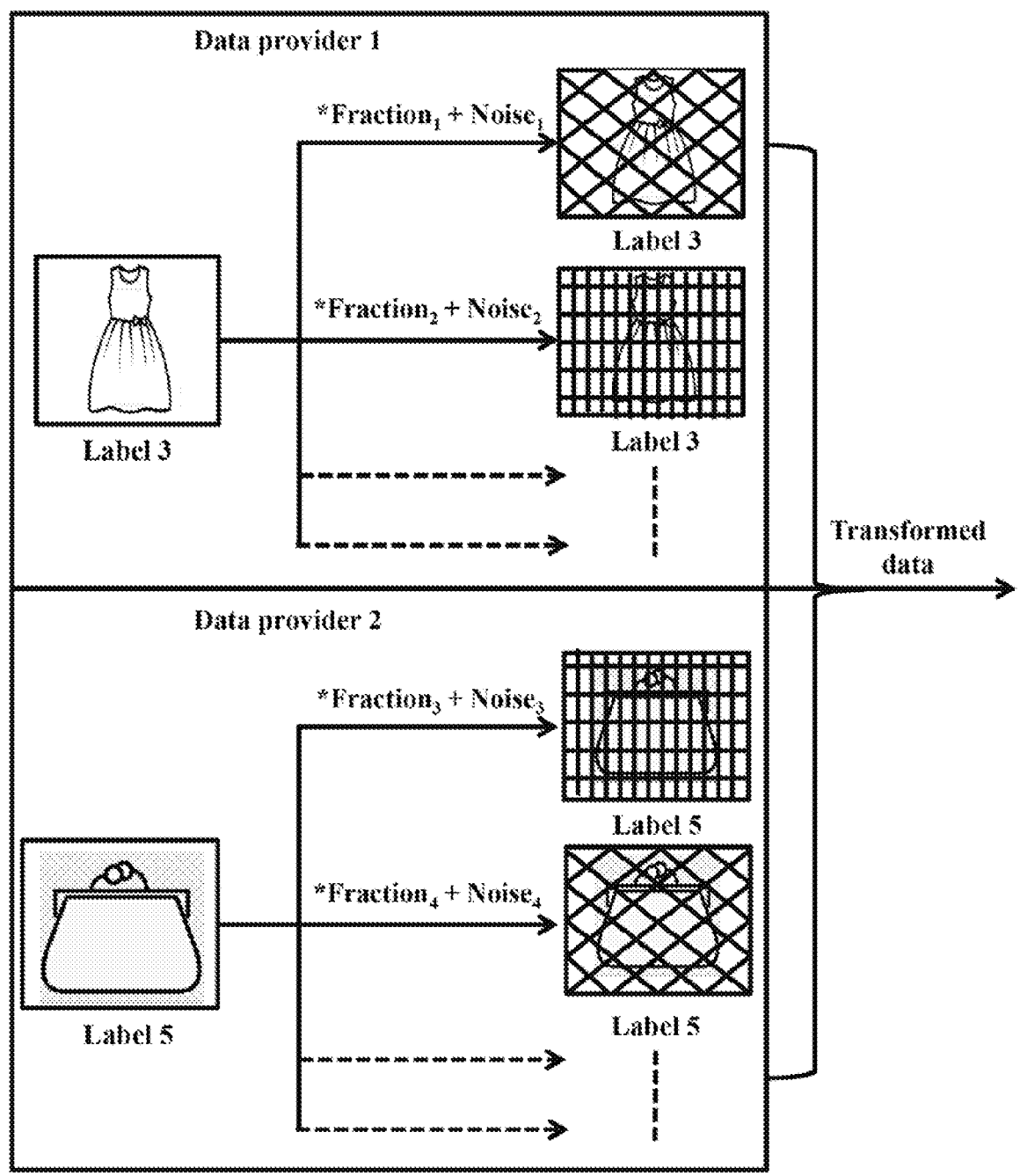
FIG. 3C is an example illustrating using transformed data from multiple data providers to train ML models, according to an embodiment of the disclosure.

FIG. 3C is an example illustrating using transformed data from multiple data providers to train ML models, according to an embodiment of the disclosure.

Referring to the FIG. 3C, consider multiple data points of the data inputs (indicated by labels). The proposed method includes splitting each of the data point into plurality of fractions and adding permissible amount of noise to the fractions so that the data points get corrupted enough to not get backtracked to the original data point.

The first step is to multiply the fractions with the data. The fraction to which the original data is multiplied to hide the details of the data is randomly chosen by the data provider. However, the fraction has to be chosen such that the data is secured but also care should be taken that the data is not transformed to such as extent that the originality is lost. Therefore, a recommended range for selection of the fraction is 0.3 to 0.5 so that the data is neither largely destroyed nor exposed. Choosing smaller fractions than 0.3 can be compensated by providing more instance of the same data point, thus not hampering the training much. For audio and image signals, multiplying with the fraction reduces the strength of the signal and adding noise introduces distortion. For these two type of signals, the NN model is expected to perform comparably well with respect to the model trained on the original data as this alteration could be visualized as training under data augmentation setting.

The choice of noise added to each fraction can possibly be a combination of Gaussian, Salt & Pepper and Speckle noise. All the data points which are generated from the single unit of the data and are trained with the same original label. The number of data points provided after corrupting single unit of data with different fractions and noises is governed by the data provider. The proposed method enables the user to provide the data without being concerned about the data security and user data privacy while sharing the original confidential data.

Figure 3D:
FIG. 3D illustrates examples of various transformed data using a data transformation engine, according to an embodiment of the disclosure.

FIG. 3D illustrates examples of various transformed data using a data transformation engine, according to an embodiment of the disclosure.

Referring to the FIG. 3D, the various datasets such as for example but not limited to CIFAR10, Fashion-MNIST and Environment Sound Classification (ESC-50) (Amplitude Plot) are taken as inputs (operation 1) and transformed by adding appropriate noise to the inputs. The transformed outputs at operation 2 are unrecognizable as compared to the inputs at operation 1. Thereby securing the input data completely.

The experimentation of the transformation of the input is performed over the CIFAR10, the Fashion-MNIST and the ESC-50 datasets. Three data points are created from each data point and a combination of S&P and Gaussian noise is added to each of the data points. A 5 convolutional layer and 3 dense layer model is used for transforming the CIFAR10 dataset. Similarly, a 2 convolutional layer and 2 dense layer model is used for transforming the FMNIST dataset. Trainings are performed for 30 epochs for all experiments done on the CIFAR10 dataset and the FMNIST dataset.

For the ESC-50 dataset, audio wave data is converted into mel-spectrogram and a Convolution Neural Network (CNN) having 4 parallel sets of 4 convolutional layers each and a single dense layer at the end is used. The CNN achieves an accuracy of around 62.8% over testing data on training for 95 epochs.

The accuracy achieved in case of the ESC-50 dataset using the data transformation approach is higher than the original accuracy. This increase could be accounted to improved model generalization (which corresponds to lower statistical bias) achieved because of training over (3× times) more data points. Transformed Data Results are provided in Table 1.

TABLE 1

| Dataset | Classes | Accuracy (%) | |
| --- | --- | --- | --- |
| | | Original data | Transformed data |
| CIFAR-10 | 10 | 80.3 | 79.7 |
| FMNIST | 10 | 99.7 | 92.3 |
| ESC-50 | 50 | 56.8 | 62.77 |

Figure 4A:
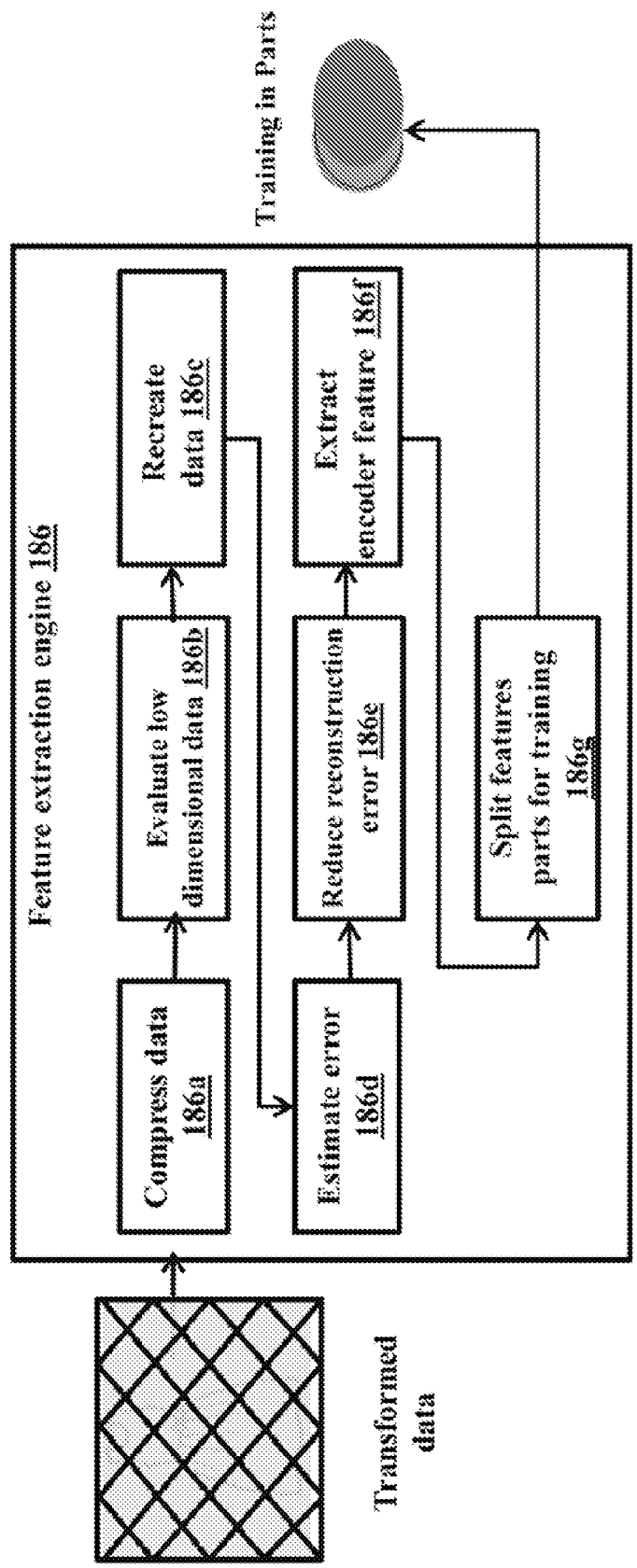
FIG. 4A is a block diagram of a feature extraction engine, according to an embodiment of the disclosure.

FIG. 4A is a block diagram of a feature extraction engine, according to an embodiment of the disclosure.

Referring to the FIG. 4A, the feature extraction engine 186 receives the transformed data from the data transformation engine 184. At step 186a, the transformed data is compresses to reduce the dimension of the transformed data and at step 186b the low dimensional data is evaluated. At step 186c, the original data (image or audio or text) is recreated from the low dimensional transformed data such that the original characteristic of the raw data is not lost. Further, at step 186d, the recreated data is compared to the original raw data and an error is estimated based on the comparison and at step 186e, a reconstruction error is reduced based on step 186d. Further, the feature extraction engine 186 at step 186f extracts the critical features from the recreated data and at step 186g, splits the extracted features into various groups. The splitting of the extracted features into various groups ensures that the servers which are trained with the extracted features will not be able to arrive at the original data since the servers do not have the complete data. The various groups of the extracted features are then used to train the various servers in parts.

Figure 4B:
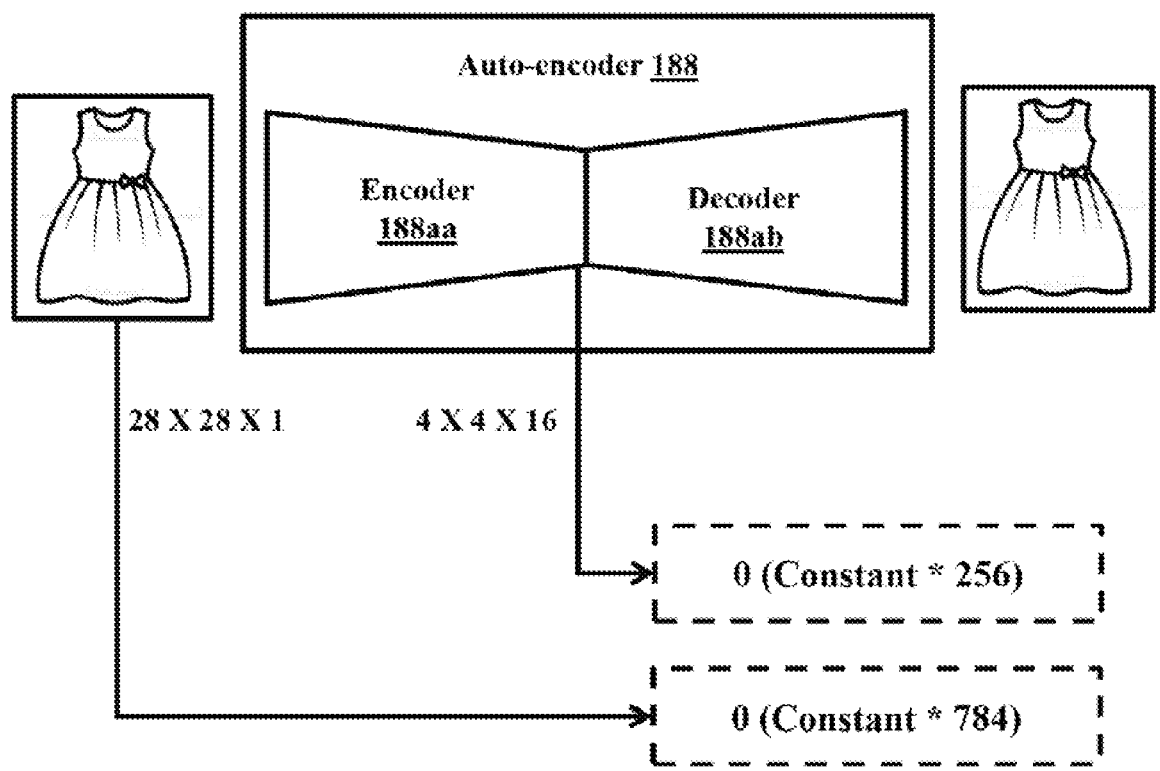
FIG. 4B is an example illustrating working of an auto-encoder, according to an embodiment of the disclosure.

FIG. 4B is an example illustrating working of an auto-encoder, according to an embodiment of the disclosure.

Referring to the FIG. 4B, the auto-encoder 188 is a speed enhanced version of basic SPDZ protocol which is widely used in the SMPC domain. The speed improvement is noticed while performing the SPDZ over dimensionally reduced input data. Run time complexity for performing forward and backward propagation step for a first layer having input size A×B×C and kernel size X×Y×Z and N servers in a SPDZ setting is given by—

$$\text{Complexity}=O(N^2 * X * Y * C * (A-X+1) * (B-Y+1))$$

The dimensionality reduction is achieved using the auto-encoder 188 which is already trained over blanket/universal data in order to successfully extract important generic features from the input data. The auto-encoder 188 performs an additional task of the feature encryption as the latent space representation obtained at the bottleneck layer cannot be interpreted directly. Thus even if the encrypted data are colluded at the SPDZ servers the original input cannot be reconstructed. Further, to improve the speed further, the SPDZ servers approximates the non-linear function like ReLU, Sigmoid and Max Pooling prescribed by the model owner into a polynomial function as performing these operations is very expensive. The SPDZ learns the established polynomial approximated function using the secret shares obtained from data and model provider. The auto-encoder 188 provides approximately three times lesser complexity for computing the first layer using Feature Extraction with the help of the auto-encoder 188 for say example, FMNIST data.

Figure 4C:
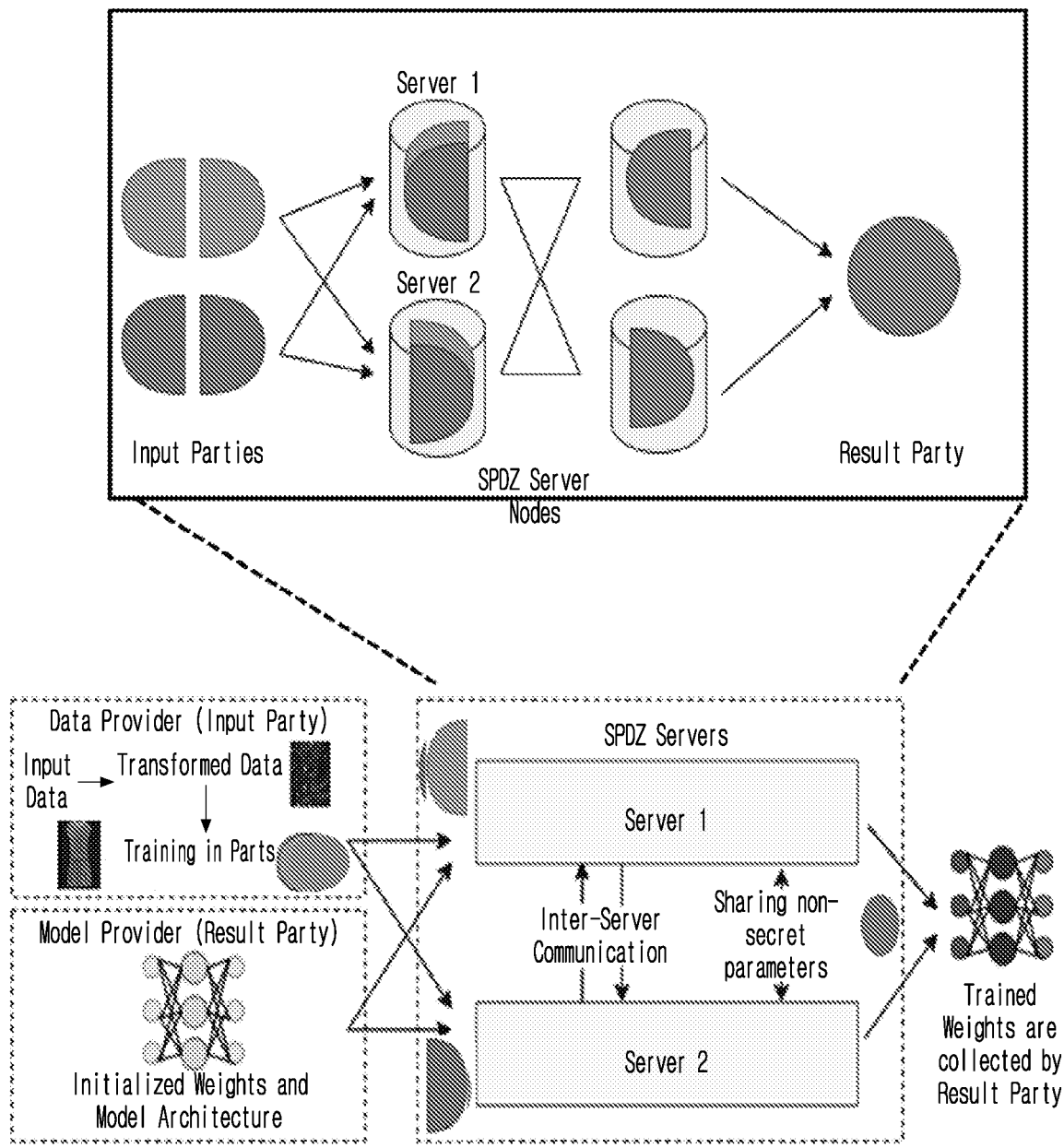
FIG. 4C is an example illustrating flow of data for training-in-parts mechanism by an auto-encoder using an SPDZ protocol, according to an embodiment of the disclosure.

FIG. 4C is an example illustrating flow of data for training-in-parts mechanism by an auto-encoder using SPDZ protocol, according to an embodiment of the disclosure.

Referring to the FIG. 4C, the SPDZ protocol for the secure MPC has been followed along with some novel speed enhancing tweaks. The SPDZ protocol involves the data providers (Input Party) and model provider (Result Party) to share their private training data and the model parameters respectively to multiple application servers 1000a-N in the form of additive shares.

Each application server 1000 computes their share of model parameters based on the ML function prescribed by the model provider using the secret shares that they have and the non-secret constants communicated by other application servers. After training, the reconstruction of the shared model parameters from all the application servers 1000a-N will provide the result to be on part with result of the ML function applied over the original private data.

Figure 4D:
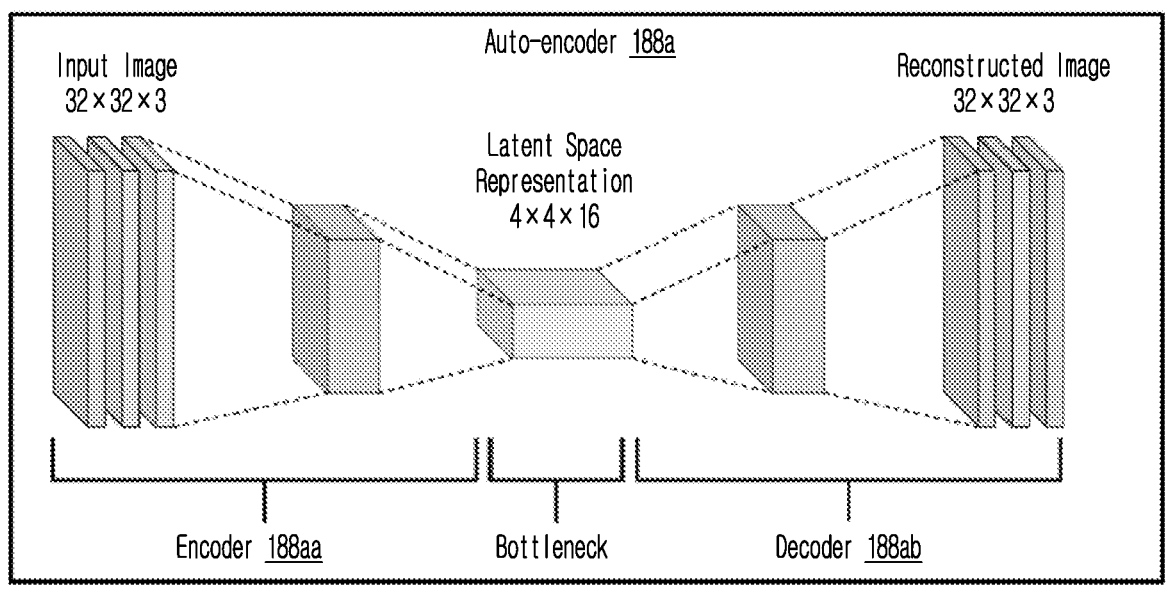
FIG. 4D illustrates an architecture of an auto-encoder, according to an embodiment of the disclosure.

FIG. 4D illustrates architecture of an auto-encoder, according to an embodiment of the disclosure.

Figure 4E:
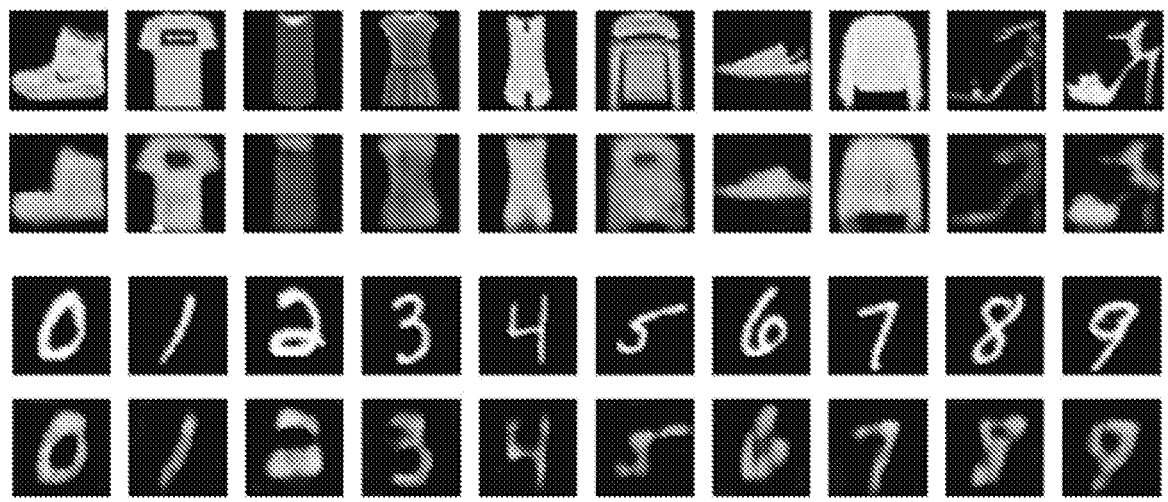
FIG. 4E is an example illustrating a comparison between original images and reconstructed images using an auto-encoder, according to an embodiment of the disclosure.

FIG. 4E is an example illustrating a comparison between original images and reconstructed images using an auto-encoder, according to an embodiment of the disclosure.

The conventional method is computationally expensive due to large inter-server communication cost.

Referring to the FIGS. 4D and 4E, the proposed training-in-parts method is much lower cost and flexible based on feature extraction on the training data using the auto-encoder 188 and polynomial approximation of prescribed non-linear NN function. To reduce the computational burden over the servers performing the SPDZ, the features are extracted from the original data using the auto-encoder 188 to reduce the dimensionality of the original data. The auto-encoder 188 comes with an added advantage of the feature encryption as the encoded features in the latent layer could not be interpreted directly even if the application servers 1000a-N collude. Referring to the FIG. 4D, the model provider shares the encoder 188a section of the auto-encoder 188 with the data providers, who in turn return the encoded features to the SPDZ servers in the form of additive shares. As the model provider does not have access to task specific training data to train the auto-encoder 188, universal/blanket dataset needs to be used for training in order to ensure extraction of powerful generic features from the input data.

For testing the technique of the 'Training In Parts' over image datasets, the auto-encoder 188 is trained on ImageNet Resized 32×32 dataset for the purpose of model generalization. The auto-encoder 188 used has 3 and 4 convolutional layers in the encoder 188aa and decoder 188ab sections respectively, and is trained for 10 epochs. The encoding in the bottleneck layer is kept of shape 4×4×16 (HWC).

Figure 5A:
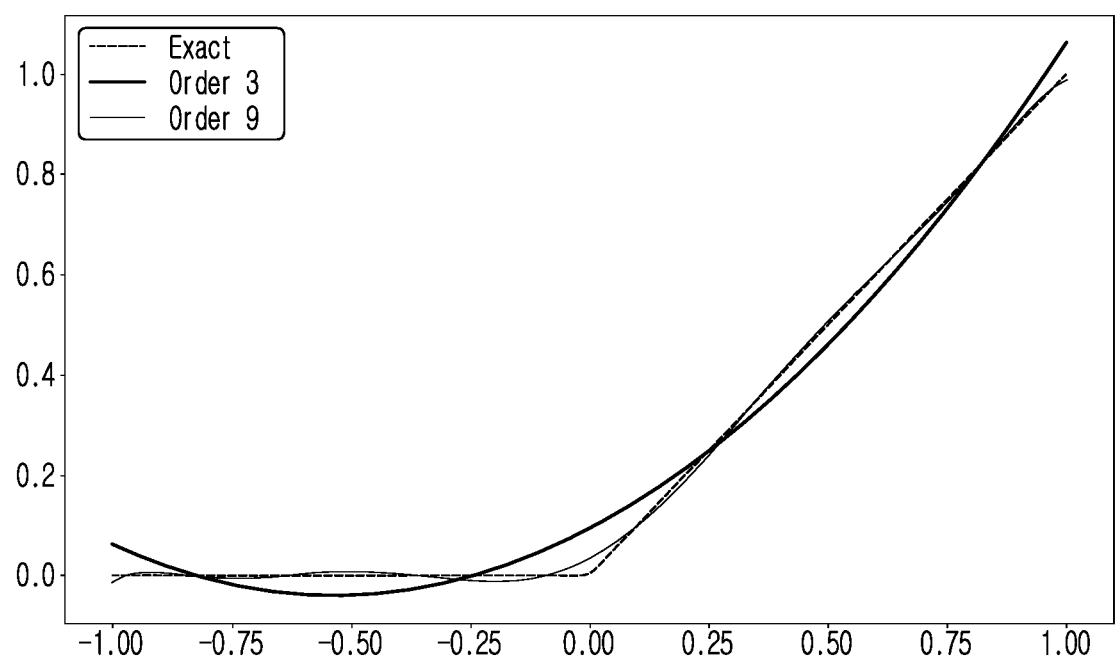
FIG. 5A illustrates ReLU approximation using $3^{rd}$ and $9^{th}$ degree polynomial, according to an embodiment of the disclosure.

FIG. 5A illustrates ReLU approximation using $3^{rd}$ and $9^{th}$ degree polynomial, according to an embodiment of the disclosure.

Figure 5B:
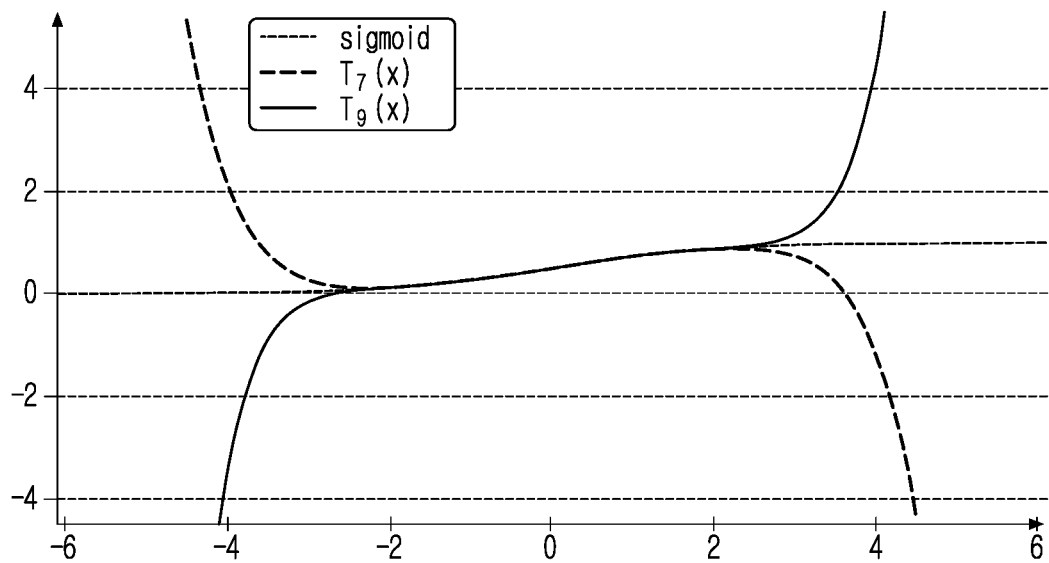
FIG. 5B illustrates Sigmoid approximation using $7^{th}$ and $9^{th}$ degree polynomial, according to an embodiment of the disclosure.

FIG. 5B illustrates Sigmoid approximation using $7^{th}$ and $9^{th}$ degree polynomial, according to an embodiment of the disclosure.

In the proposed method, for training the NN function prescribed by the model provider using the SPDZ servers, secret-sharing is adopted for inter-server communication to mask the values used in the computations. Multiplications and additions are performed privately for tensors using trivial SPDZ, directly enabling the dot products and element-wise multiplications used in Dense layers and Convolutional layers of the auto-encoder 188.

Referring to the FIG. 5A, a non-linear operation of the ReLU is approximated using a $3^{rd}$ a degree polynomial function. Further, Max Pooling is replaced by Average Pooling as both of these operations are computationally expensive.

Referring to the FIG. 5B, the final Sigmoid layer is approximated using a $9^{th}$ degree polynomial function. The encoded features from bottleneck layer of the auto-encoder 188 are shared among the servers that communicate non-secret constants to train their share of parameters following the established polynomial approximated relationship.

The proposed method of extracting plurality of features from the data associated with the application and encrypting the same i.e., training in parts is experimented over FMNIST dataset. The encoded features obtained from the encoder 188a of the auto-encoder 188 published by the model provider are of shape 4×4×16 (HWC).

The CNN trained on the SPDZ servers for FMNIST classification task consists of one convolutional layer and one dense layer. The model trained over 100 epochs achieves an accuracy of about 87.8%. The encoded data and model parameters are shared over a pair of 2 servers. The accuracy and time are provided in Table 2.

TABLE 2

| Technique | Accuracy (%) | Time (in HH:MM) |
| --- | --- | --- |
| Training in parts | 87.76 | 00:46 |
| Vanilla SPDZ | 88.15 | 02:13 |

For Vanilla SPDZ, the training is performed over original the raw data without applying any feature extraction and polynomial approximation optimizations. The time taken for running single epoch is considered. Almost similar accuracy is achieved through the proposed technique along with added security (because of feature encryption) and approximately three times training speed enhancement is achieved.

Figure 6:
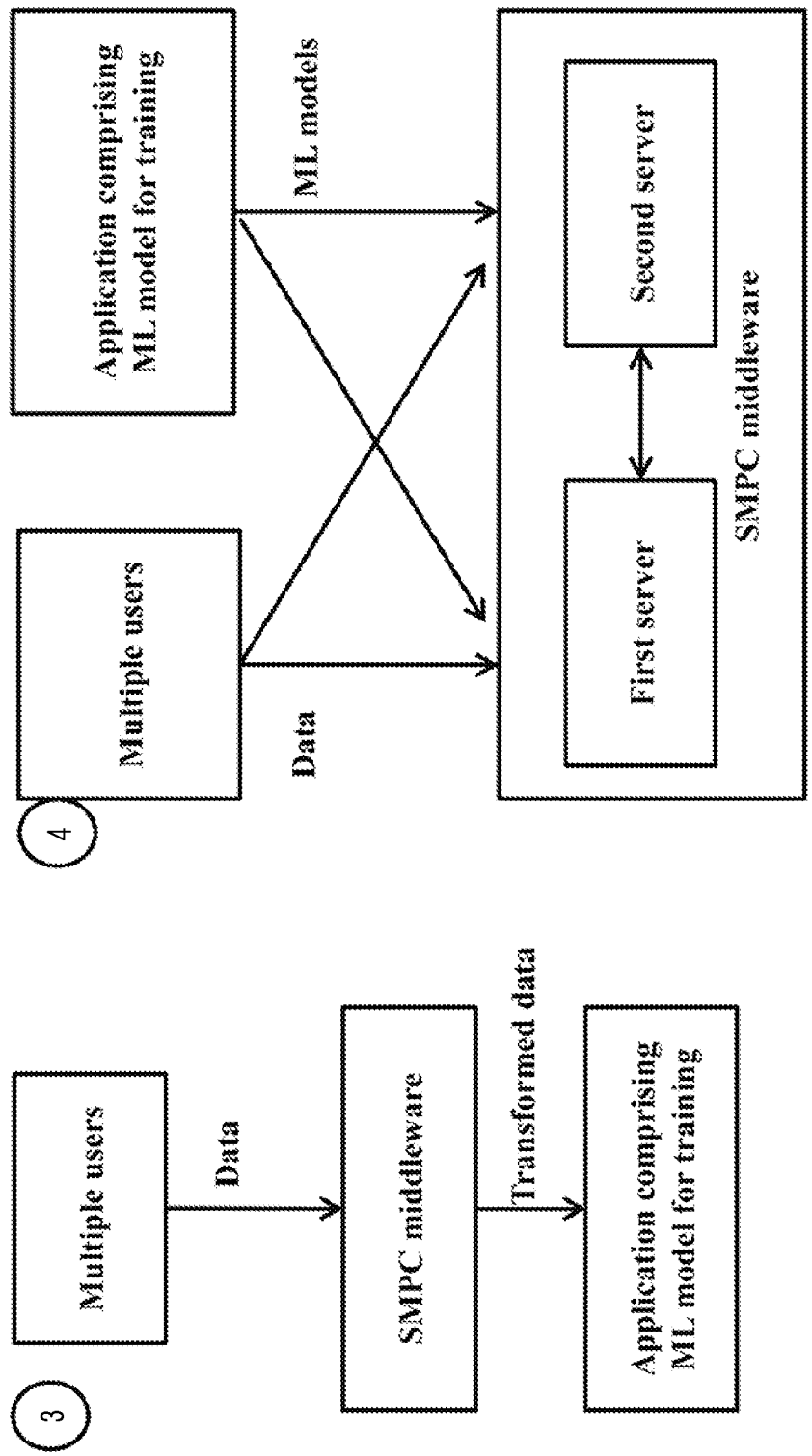
FIG. 6 is an example illustrating use case of training model by SMPC by ensuring user data privacy, according to an embodiment of the disclosure.

FIG. 6 is an example illustrating use case of training a model by an SMPC by ensuring user data privacy, according to an embodiment of the disclosure.

Referring to the FIG. 6, the data security management controller 180 can be provided as an intermediary performing the task of ensuring privacy of the sensitive data being uploaded by the users on various third party applications. The third party applications would require the data to train the ML models 122b.

At panel 3, when the users upload the data to any third party application, the data is first passed through the SMPC Middleware, before the application gets access to the user data. The SMPC Middleware performs secures the user data by transforming the user data using the noise input before providing the user data to the third party application. The third party application then uses the transformed data to train their model either on volunteered user devices or on the own servers. In another embodiment, the SMPC Middleware is provided in the data security management controller 180 of the electronic device 100 when the data transformation is provided on-device.

At panel 4, the user's data and the third party application's ML models are uploaded on the SMPC Middleware's servers in the form of additive shares. The servers then compute the model parameters and give them back to the application owner. The SMPC Middleware first performs the feature extraction on the user's raw data and then performs the model training based on the proposed 'Training In Parts' technique. The SMPC Middleware can perform model training either on cloud servers or on volunteered user devices. Thus the proposed techniques could be introduced in the form of privacy enhancement features, benefiting both mobile device users and mobile app developers.

Figure 7:
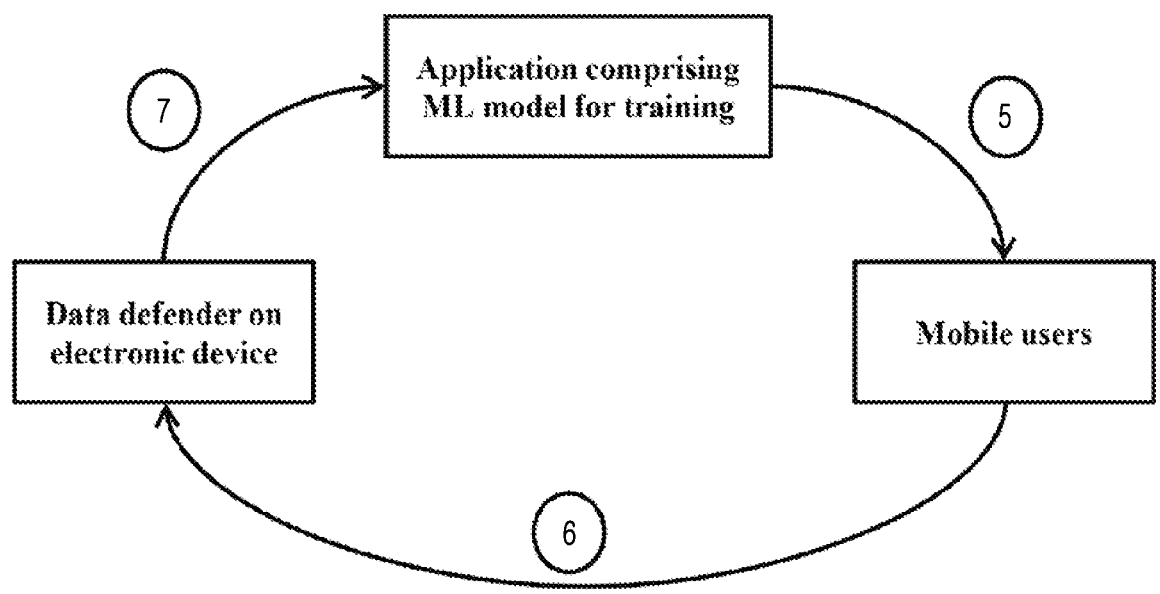
FIG. 7 is yet another example illustrating use case of training a model by an SMPC with user data privacy, according to an embodiment of the disclosure.

FIG. 7 is yet another example illustrating use case of training a model by an SMPC with user data privacy, according to an embodiment of the disclosure.

Referring to FIG. 7, at step 5, the application requests the user data from the users. At operation 6, the user of the electronic device 100 shares the actual data directly to the data defender present in the electronic device 100 and not with the application directly. At operation 7, the data defender present on the electronic device 100 masks the actual user data and offers the masked data to the application comprising the ML model for training. Therefore, in real-time the user data which may be private data of the user such as health related data, payment related data or biometric data, etc. is secured before sharing it with the applications. As a result, the shared data can be used for training the ML models of the application at the same time achieving user data privacy.

Figure 8A:
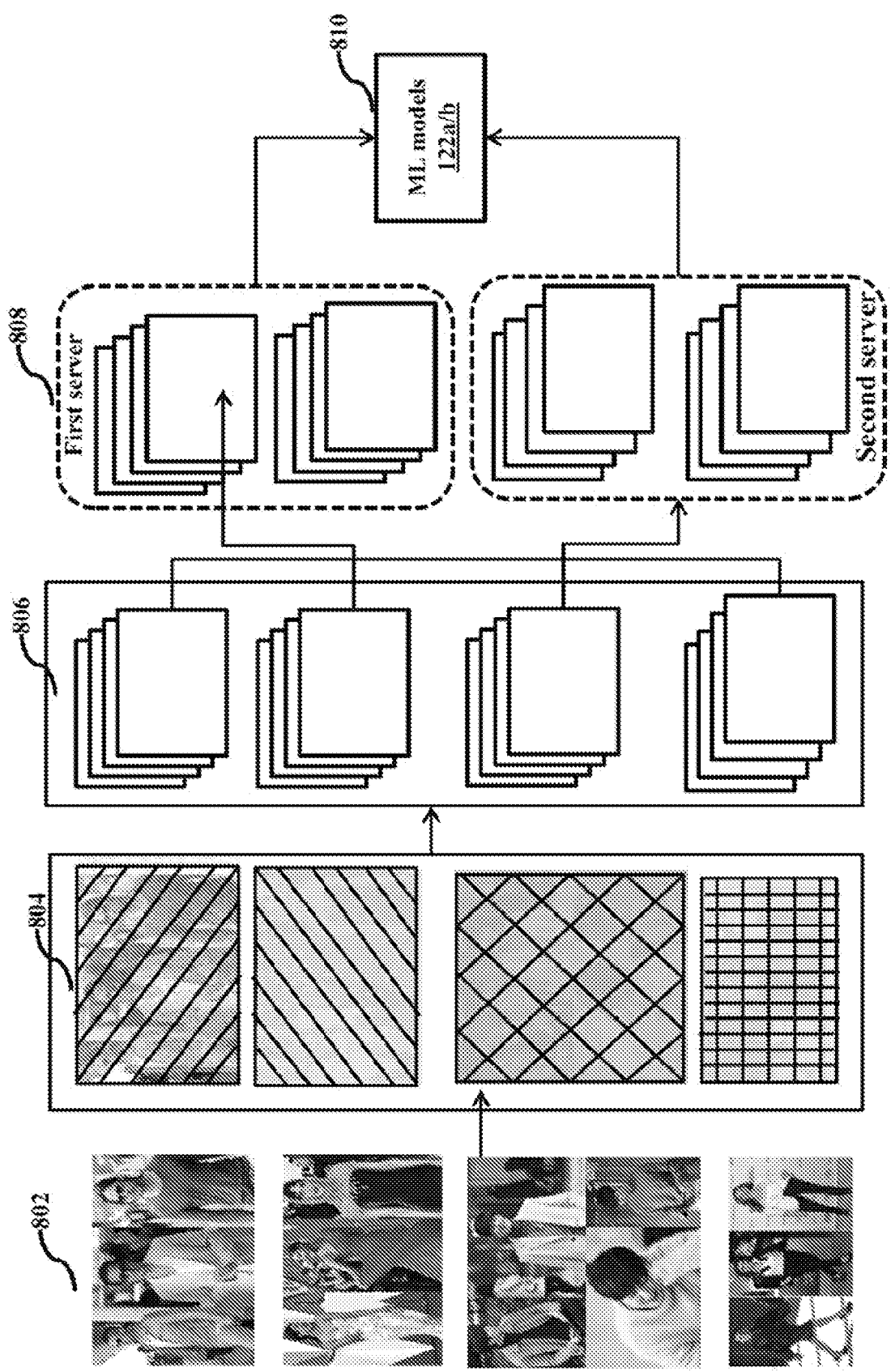
FIGS. 8A and 8B are examples illustrating a scenario of determining a uniqueness of a celebrity apparel by securely trained ML model, according to an embodiment of the disclosure.
Figure 8B:
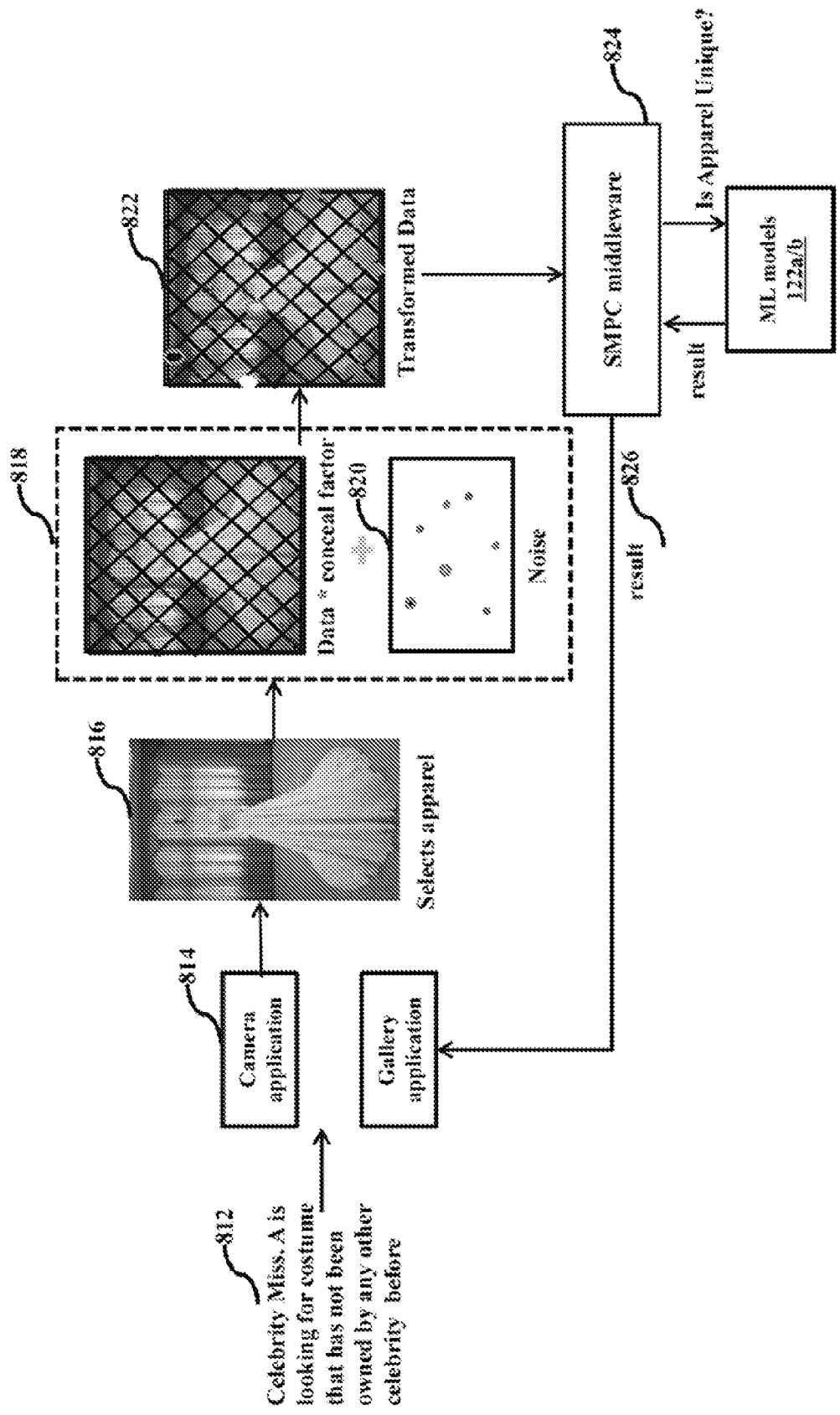

FIGS. 8A and 8B are examples illustrating a scenario of determining a uniqueness of celebrity apparel by securely trained ML model, according to an embodiment of the disclosure.

Referring to FIGS. 8A and 8B, consider a scenario where celebrities are attending a fashion event where every celebrity wants to wear unique apparel. However, in general if the celebrity wants to know if their apparel is unique or not then they may have to reveal their apparel which fails the whole purpose of the concealment.

The proposed method solves the above problem as follows: at operation 802, various celebrities share the image of their apparels to the electronic device 100 and at operation 804, the electronic device 100 transforms the image of each celebrity apparel using a corresponding conceal factor and noise. The transformed images of the celebrity apparels are secure data where the original raw image is concealed and cannot be easily recovered. Further, at operation 806, the electronic device 100 extracts critical features from each of the celebrity apparel images and groups the extracted features based on factors such as colour, shape, texture, etc. At operation 808, the grouped extracted features are then sent to various servers to train their ML models 122a or 122b operation 810. The trained ML models 122a or 122b are now capable identifying if the apparels are unique or not based on inputs.

At operation 812, consider that a celebrity Miss. A is looking for costume that has not been owned by any other celebrity for a specific fashion event. The celebrity Miss. A clicks an image of the costume and selects one image in operations 814 and 816. At operation 818, the electronic device 100 determines the conceal factor and noise in operation 820 for the image of the apparel and multiplies the image with the conceal factor. The electronic device 100 also adds noise to the image to obtain the transformed image in operation 822. Further, at operation 824, the electronic device 100 passes the transformed image through the SMPC middleware and checks with the ML models 122a or 122b if the apparel captured in the image is unique or not. Further, at operation 826, the electronic device 100 provides the result to the celebrity regarding the uniqueness of the apparel. Therefore, the proposed method can be used to check the uniqueness of a product without revealing the product itself. This can also be used in various industries like the auto sector where various models of vehicles can be checked for unique features, uniqueness of biometric factors, etc.

Figure 9:
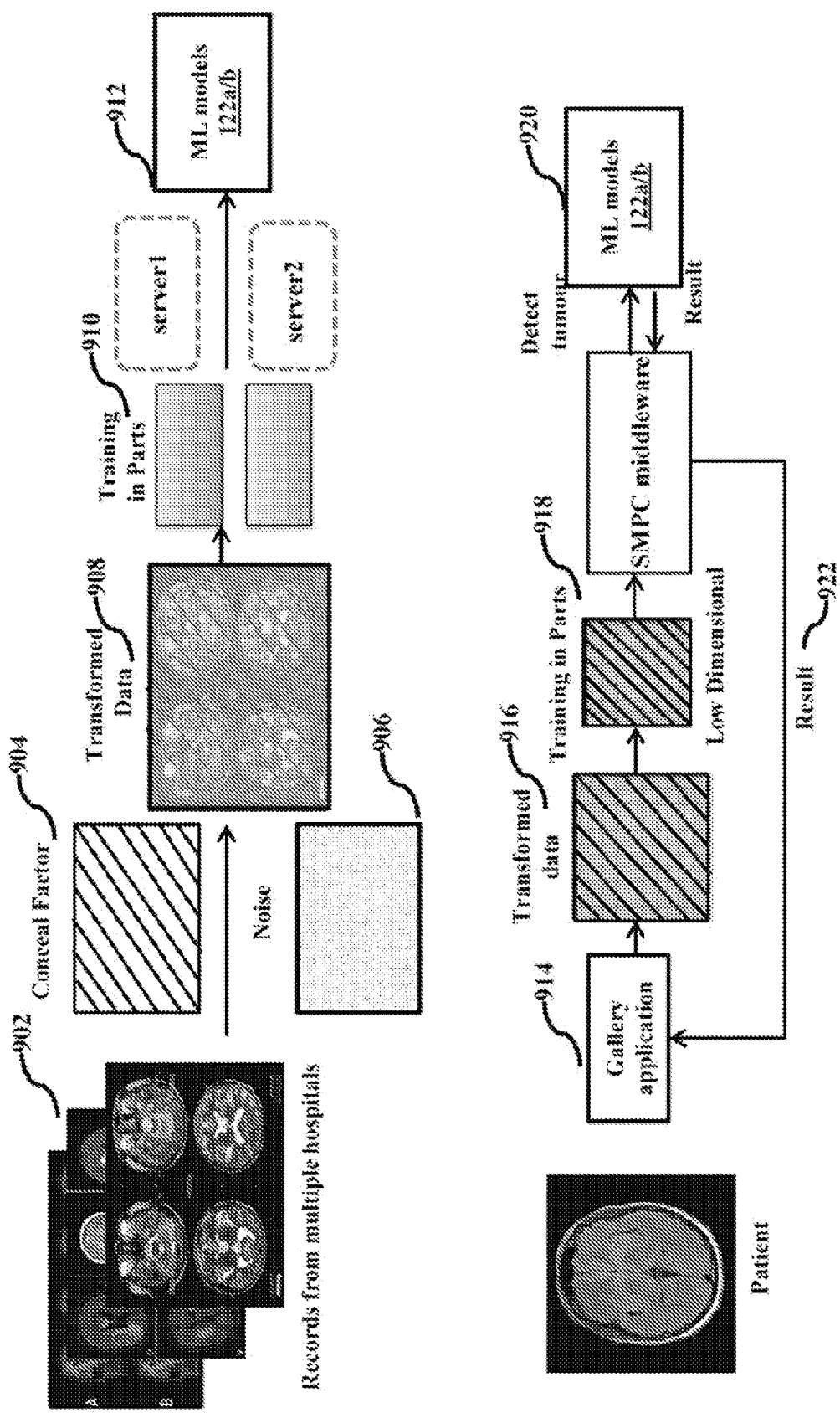
FIG. 9 is an example illustrating a scenario of tumor detection by securely trained ML model, according to an embodiment of the disclosure.

FIG. 9 is an example illustrating a scenario of tumor detection by securely trained ML model, according to an embodiment of the disclosure.

Referring to the FIG. 9, consider that multiple hospitals having multiple diagnosis reports of their patients can use the multiple diagnosis reports to train a ML model which can then be used to diagnose health conditions of a patient based on the diagnosis report. However, by conventional methods the training of the ML models using the multiple diagnosis reports from the multiple hospitals may not be possible without invading privacy of individual patients. Further, the patients may not agree to share their confidential medical reports for training by a third party.

In the proposed method, at operation 902, the multiple diagnosis reports form the multiple hospitals are received by the electronic device 100. At operation 904, the electronic device 100 determines and multiplies the conceal factor corresponding to each of the diagnosis reports. At operation 906, the electronic device 100 determines and adds appropriate noise to each of the concealed diagnosis reports to obtain the transformed data at operation 908. At operation 910, the electronic device 100 extracts critical features from each of the transformed data and groups the transformed data into multiple groups. At operation 912, the electronic device 100 shares individual groups to different servers, which use the received transformed data to train the ML models 122a or 122b. Therefore, due to the training the ML models 122a or 122b are capable of predicting the health conditions of the patients.

At operation 914, consider that the patient wants to identify their health condition based on the diagnosis report and therefore, the patient uploads the diagnosis report to the electronic device 100. At operation 916, the electronic device 100 transforms the uploaded diagnosis report using the conceal factor and the noise. At operation 918, the electronic device 100 determines the low dimensional transform data and at step 920, the SMPC middleware sends the low dimensional transform data to the ML models 122a or 122b to detect the tumor in the diagnosis report of the patient. Further, at operation 922, the result of the tumor detection is then sent to the electronic device 100, where the patient can know if the diagnosis report indicates the presence of the tumor or not. Therefore, the use of the proposed method for training the ML models 122a or 122b enables the patients to instantly know if their diagnosis report has presence of the tumor. As a result, the proposed method can be widely used in telemedicine to instantly provide diagnosis of various health conditions of users. Also, the multiple diagnosis reports of the patients of the multiple hospitals also are secured as the raw data is never used for training the ML models 122a or 122b, rather only the transformed data and extracted features from the transformed data are used for training the ML models 122a or 122b.

Figure 10:
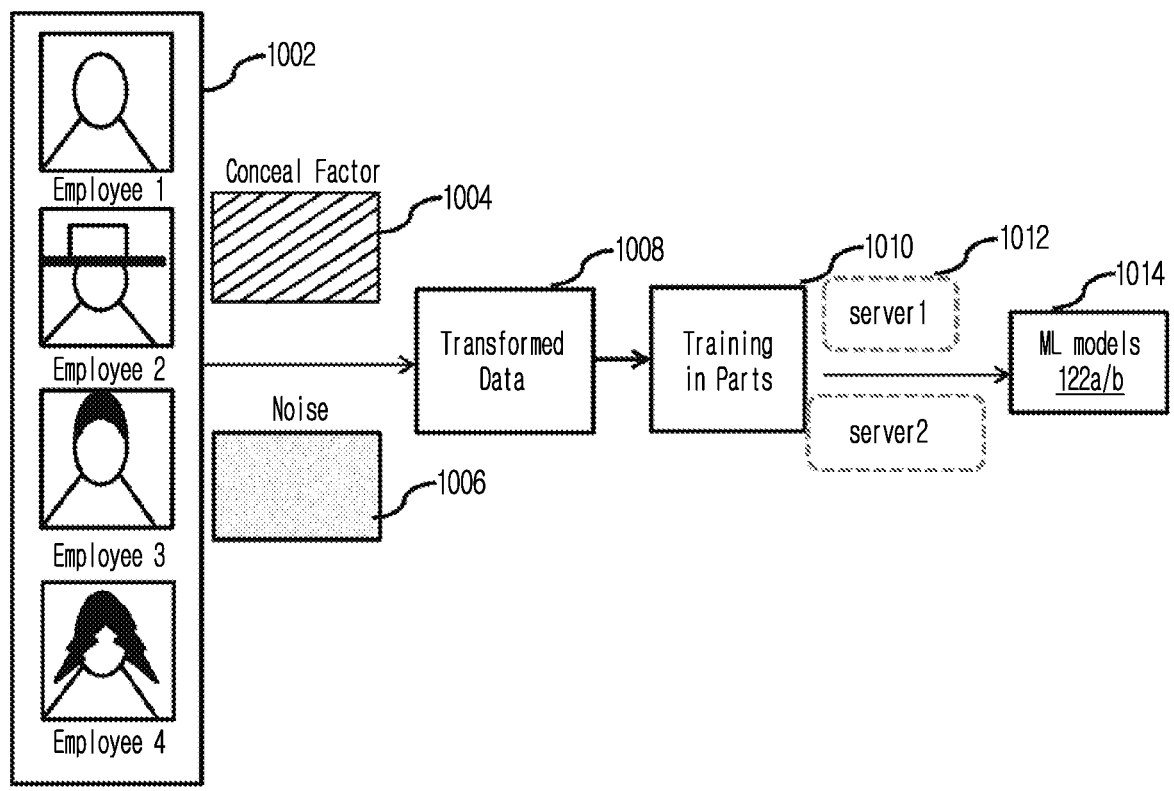
FIG. 10 is an example illustrating a scenario of storing employee information by securely trained ML model, according to an embodiment of the disclosure.

FIG. 10 is an example illustrating a scenario of storing employee information by securely trained ML model, according to an embodiment of the disclosure.

Referring to the FIG. 10, at operation 1002, details of employees of an organization such as for example but not limited to employee ID, employee address, employee team details, employee biometrics, etc. which needs to be protected when it is stored. Further, the details of the employees should be shared only with protection for any organization related activities.

At operation 1004, the electronic device 100 determines the conceal factor for the details of each employee of the organization and at operation 1006, determines the noise to be added to the details of each employee. At operation 1008, the electronic device 100 obtains the secured/transformed data by multiplying the respective conceal factor with the details of each employee followed by addition of the respective noise.

At operation 1010, the electronic device 100 extracts the critical features from the details of each employee which will be used for the training in parts. The extracted features are then grouped such that similar features of the same data falls into different groups. Further, at operation 1012, the electronic device 100 shares the grouped extracted features to various server and at operation 1014, the grouped extracted features then stored in the ML models 122b in each of the various servers. Further, when there is a requirement of obtaining the details of any employee for any organization related activities, only the concealed and extracted relevant feature is shared. Therefore, confidential details of the employees are concealed and only the relevant extracted features are shared.

Figure 11:
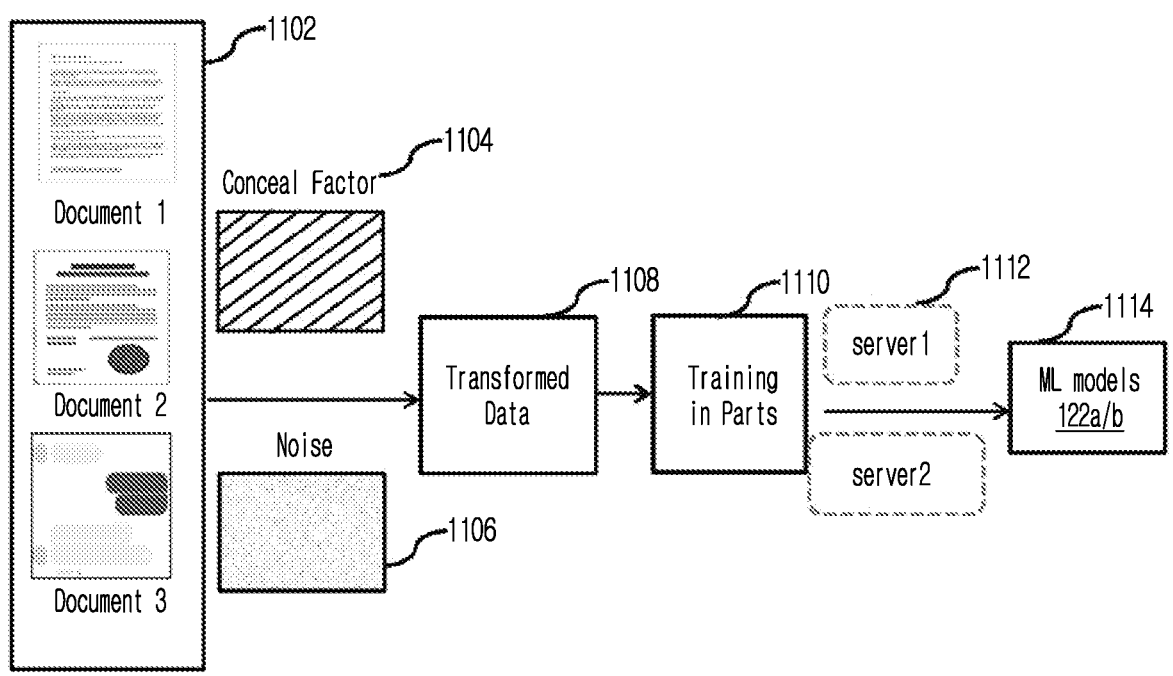
FIG. 11 is an example illustrating a scenario of using personal documentation by securely trained ML model, according to an embodiment of the disclosure.

FIG. 11 is an example illustrating a scenario of using personal documentation by securely trained ML model, according to an embodiment of the disclosure.

Referring to the FIG. 11, at operation 1102, various personal documentation of the user such as for example but not limited to personal records such as financial statements, health records, confidential messages, etc. which needs to be protected yet required for training the ML models 122a or 122b. At operation 1104, the electronic device 100 determines the conceal factor for each of the personal documentation of the user and at operation 1106, determines the noise to be added to each of the personal documentation of the user. At operation 1108, the electronic device 100 obtains the secured/transformed data by multiplying the respective conceal factor with each of the personal documentation of the user followed by addition of the respective noise. At operation 1110, the electronic device 100 extracts the critical features from the personal documentation which will be used for the training in parts. The extracted features are then grouped such that similar features of the same documentation fall into different groups. Further, at operation 1112, the electronic device 100 shares the grouped extracted features to various server and at operation 1114, the grouped extracted features are used to train ML models 122b in each of the various servers. Therefore, the confidential data of the user is used for training the ML models 122b without compromising on user privacy. Also, since there is no encryption used to conceal the data there is no need of key generation and key sharing between various entities involved, thereby making the proposed securing data sharing technique much simpler, faster and user friendly.

Forgoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for securely sharing of data by an electronic device, the method comprises:
receiving, by the electronic device, data associated with at least one application available at the electronic device;
obtaining, by the electronic device, secured data by transforming the data associated with at least one application into an unrecognizable format using at least one conceal factor and at least one noise input;
extracting, by the electronic device, a plurality of features from the secured data; and
sharing, by the electronic device, the plurality of features extracted from the secured data to a plurality of servers,
wherein the obtaining, by the electronic device, of the secured data by transforming the data associated with the at least one application into the unrecognizable format using the at least one conceal factor and the at least one noise input comprises:
determining, by the electronic device, the at least one conceal factor based on the plurality of features of the data associated with the at least one application;
obtaining, by the electronic device, concealed data by multiplying the data with the at least one conceal factor data to hide a plurality of details associated with the data;
determining, by the electronic device, the at least one noise input to be added to the concealed data to transform the concealed data into unrecognizable format; and
obtaining, by the electronic device, the secured data by transforming the concealed data into the unrecognizable format by adding the at least one noise input to the concealed data.

2. The method as claimed in claim 1, wherein the plurality of features extracted from the secured data are used to perform at least one of:
training at least one model at at least one server, or
performing an inference using the at least one model at the at least one server.

3. The method as claimed in claim 1, wherein the at least one noise input comprises:
at least one of a Gaussian noise comprising Gaussian Distributed values of the at least one noise input;
a salt-and-pepper comprising a sparse distribution of noise values of the at least one noise input; and
a Speckle noise comprising granular interference of the at least one noise input.

4. A method for securely sharing of data by an electronic device, the method comprises:
receiving, by the electronic device, data associated with at least one application available at the electronic device;
obtaining, by the electronic device, secured data by transforming the data associated with at least one application into an unrecognizable format using at least one conceal factor and at least one noise input;
extracting, by the electronic device, a plurality of features from the secured data; and
sharing, by the electronic device, the plurality of features extracted from the secured data to a plurality of servers,
wherein the extracting, by the electronic device, of the plurality of features from the secured data comprises:
reducing, by the electronic device, a dimension of the secured data by performing a compressing on the secured data;
recreating, by the electronic device, the concealed data comprising the plurality of features of the data associated with the at least one application using the compressed secured data; and
extracting, by the electronic device, the plurality of features from the recreated concealed data.

5. The method as claimed in claim 1, wherein the sharing, by the electronic device, of the plurality of features extracted from the secured data to the plurality of servers comprises:
splitting, by the electronic device, the extracted plurality of features into a plurality of groups; and
sharing, by the electronic device, at least one group of the plurality of groups comprising the extracted plurality of features to at least one server of the plurality of servers.

6. The method as claimed in claim 1,
wherein the plurality of features from the secured data is extracted by an auto-encoder of the electronic device, and
wherein the auto-encoder is trained with the plurality of features.

7. An electronic device for securely sharing of data, the electronic device comprises:
a memory;
a processor coupled to the memory;
a communicator coupled to the memory and the processor; and
a security management controller coupled to the memory, the processor and the communicator, the security management controller configured to:
receive data associated with at least one application available at the electronic device,
obtain secured data by transforming the data associated with at least one application into an unrecognizable format using at least one conceal factor and at least one noise input,
extract a plurality of features from the secured data, and
share the plurality of features extracted from the secured data to a plurality of servers,
wherein the security management controller is configured, when obtaining the secured data by transforming the data associated with the at least one application into the unrecognizable format using the at least one conceal factor and the at least one noise input, to:
determine the at least one conceal factor based on the plurality of features of the data associated with the at least one application,
obtain concealed data by multiplying the data with the at least one conceal factor data to hide a plurality of details associated with the data,
determine the at least one noise input to be added to the concealed data to transform the concealed data into unrecognizable format, and
obtain the secured data by transforming the concealed data into the unrecognizable format by adding the at least one noise input to the concealed data.

8. The electronic device as claimed in claim 7, wherein the plurality of features extracted from the secured data is used to perform at least one of:
train at least one model at at least one server, or
perform an inference using the at least one model at the at least one server.

9. The electronic device as claimed in claim 7, wherein the at least one noise input comprises:
at least one of a Gaussian noise comprising Gaussian Distributed values of the at least one noise input;
a salt-and-pepper comprising a sparse distribution of noise values of the at least one noise input; and
a Speckle noise comprising granular interference of the at least one noise input.

10. The electronic device as claimed in claim 7, wherein the security management controller is configured, when extracting the plurality of features from the secured data, to:
reduce a dimension of the secured data by performing a compressing on the secured data,
recreate the concealed data comprising the plurality of features of the data associated with the at least one application using the compressed secured data, and
extract the plurality of features from the recreated concealed data.

11. The electronic device as claimed in claim 7, wherein the security management controller is configured, when sharing the plurality of features extracted from the secured data to the plurality of servers, to:
split the extracted plurality of features into a plurality of groups, and
share at least one group of the plurality of groups comprising the plurality of extracted features to at least one server of the plurality of servers.

12. The electronic device as claimed in claim 7,
wherein the plurality of features from the secured data is extracted by an auto-encoder of the electronic device, and
wherein the auto-encoder is trained with the plurality of features.

* * * * *